Nov. 2, 1937.  T. L. FAWICK  2,097,856
CLUTCH
Filed Oct. 29, 1936  2 Sheets-Sheet 1

Inventor:
Thomas L. Fawick
By:
Attys.

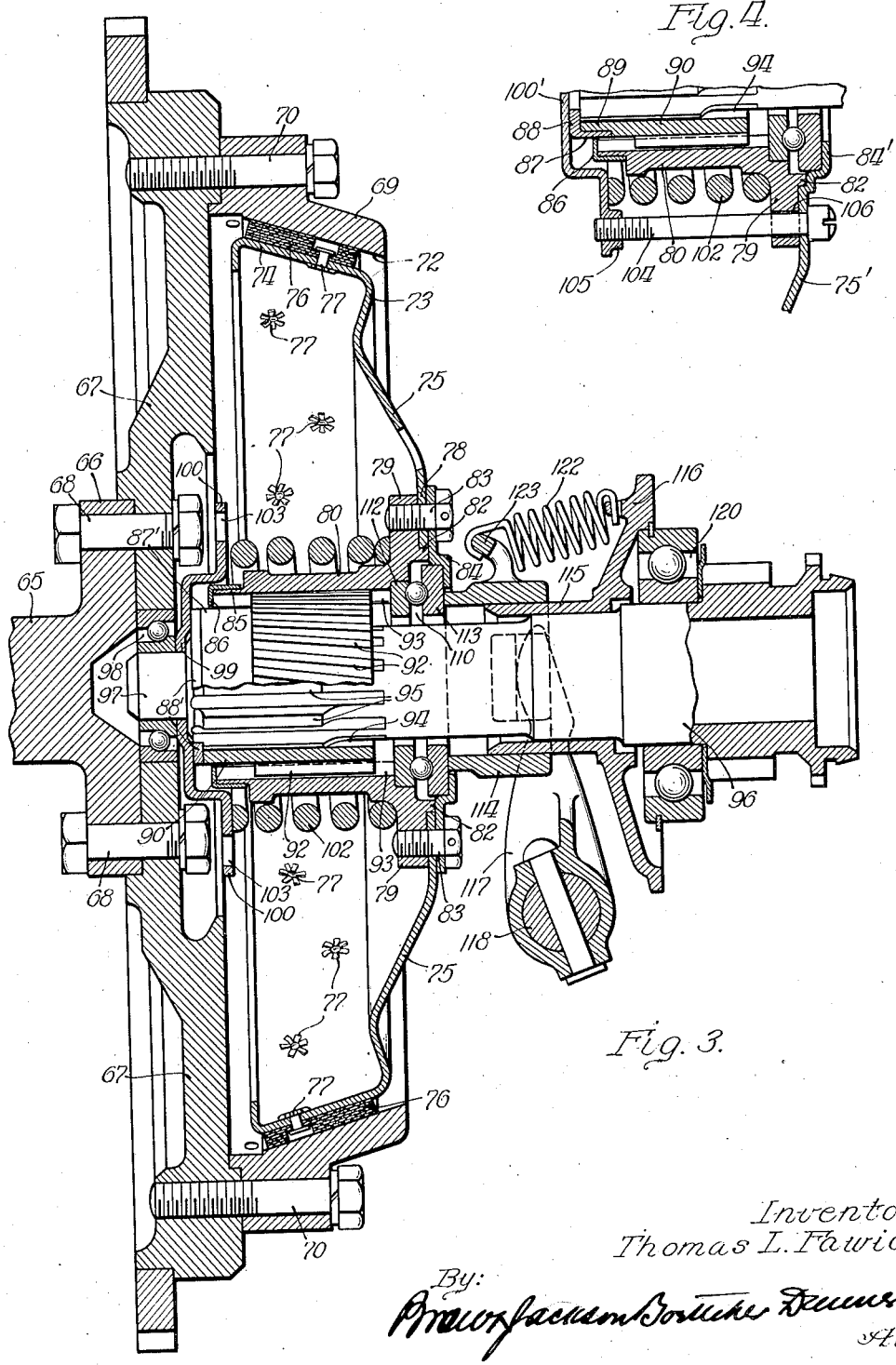

Patented Nov. 2, 1937

2,097,856

UNITED STATES PATENT OFFICE 2,097,856

CLUTCH

Thomas L. Fawick, Akron, Ohio, assignor to Industrial Clutch Company, a corporation of Wisconsin Application October 29, 1936, Serial No. 108,156

11 Claims. (Cl. 192—32)

The present invention relates to clutches, and more particularly to clutches for coupling driving and driven members for conjoint rotation. The clutch of the present invention finds utility in automotive vehicles, busses, industrial and agricultural tractors, trucks and similar vehicles, as well as in other types of industrial machinery were such members are to be coupled together for driving engagement.

In my copending application, Serial No. 707,057, filed January 18, 1934, which has matured into Patent No. 2,086,954 there is disclosed a clutch construction which broadly embodies some of the features of the present invention. However, the present application constitutes an improvement in the design and construction of such a clutch mechanism, rendering the clutch more efficient, easier to manufacture and assemble, and possessed of improved characteristics of operation and length of service.

The present invention contemplates a servo mechanism for utilizing the movement or driving force of the driving member to impart additional engaging movement of the clutch member toward the cooperating clutch member after initial engagement. Eccentric binding or chattering of the clutch is eliminated by the present construction, and a smooth, velvet-like engagement is produced. More torque is developed with less pressure of the engaging element, because the torque is developed at the largest diameter of the clutch, that is, out at the clutch engaging surface.

The present clutch is light in weight, balanced, and of economical construction. The parts are capable of being readily machined at small cost, and may be readily assembled and supported in place.

One feature of the present invention is the provision of a clutch construction which may be assembled as a unitary construction, and then employed as a repair or replacement unit for installation in position between the driving and driven members, as well as being employed in new assemblies.

A still further advantage possessed by the present construction is the ability to remove the driven assembly without detaching the clutch construction from the driving member, and to reinstall the assembly without any adjustment or rearrangement of the clutch or driving assembly. This is accomplished by providing a longitudinally removable splined connection between the clutch hub and the driven shaft, with the pilot bearing and clutch throwout bearing being retained in position independently of longitudinal movement of the splined shaft. Thus the driven shaft, as well as the clutch collar and clutch yoke, can be removed without disturbing the clutch construction or its relation to the driven member. Further, the clutch mechanism itself can be readily removed for inspection, repair and servicing by removing only the clutch ring from bolted connection to the driving member.

In the present construction I have provided an intermediate member having internal splines in driving engagement with the driven shaft, and having external helical splines engaged by corresponding splines carried by the clutch disc. The helical splined engagement produces the servo action for increasing the pressure of engagement without increasing the clutch spring pressure, thus affording smooth, positive engagement and yet allowing relatively easy disengagement. The member is preferably packed in grease within a housing formed by the hub of the clutch disc, the retainer for the pilot bearing supporting the end of the driven shaft and the throw-out bearing assembly. Thus the throw-out bearing is enclosed within the functional part of the grease housing.

Other objects and advantages of the present invention, including the details of the bearing assemblies and the clutch hub construction, will be more apparent to those skilled in the art from the following detailed description which, taken in conjunction with the accompanying drawings, will disclose the particular construction and operation of a preferred form of the present invention.

In the drawings:

Figure 3 is a sectional view of another embodiment of the clutch construction; and Figure 4 is a detail sectional view of a modification of the hub construction shown in Figure 3.

Figures 1, 2:
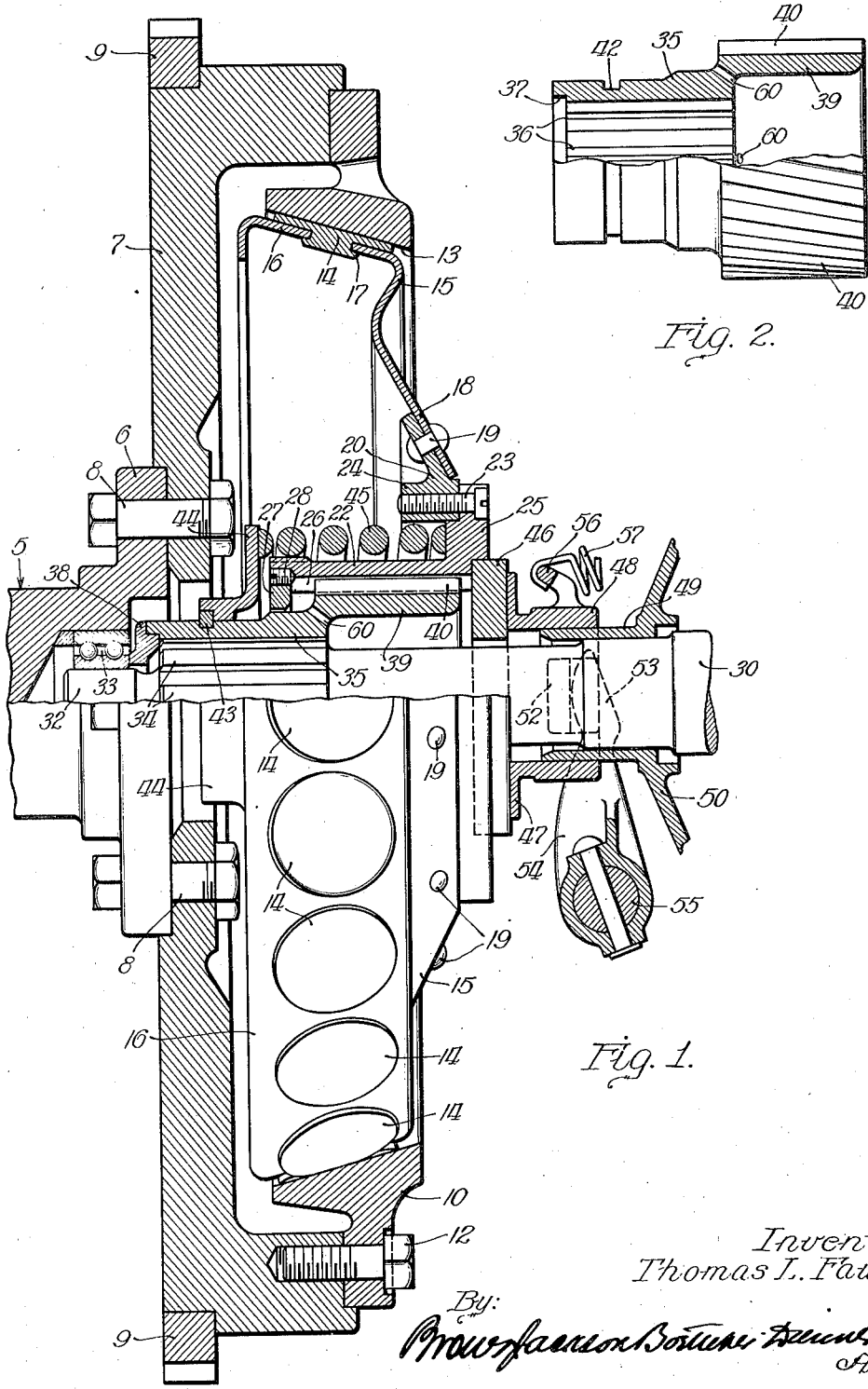
Figure 1 is a vertical sectional view, with portions in elevation, of one form of the clutch construction.
Figure 2 is a detail view, partly in section, of the intermediate hub member.

Referring now in detail to the embodiment of the invention shown in Figures 1 and 2, I have provided a drive shaft 5 having the radial flange 6, to which is bolted the flywheel 7 as by means of the ring of bolts 8. The flywheel 7 carries around its outer periphery the ring gear 9 which is adapted to have meshing engagement with a starting gear for rotating the drive shaft 5 when the vehicle or mechanism is to be started, as in the case of an automotive or internal combustion engine or the like, and is also provided with the clutch ring member 10, bolted to the radial face of the flywheel 7 by means of a peripheral series of bolts 12.

The clutch ring 10 is provided with a conical surface 13 preferably tapered axially outwardly toward the flywheel 7, and adapted to be engaged by the clutch surfaces 14 carried by the clutch member 15. The clutch surfaces 14 comprise a peripheral series of button-like members having circular planar surfaces disposed on the outer periphery of the conical rim portion 16 of the member 15, and riveted thereto as shown at 17. The members 14 take the place of the usual form of clutch lining, and serve to provide for equalized application of torque to the clutch cone 16 by contact with the conical surface 13 of the flywheel. The clutch member 15 is provided with a radially inwardly extending flange portion 18, riveted adjacent its inner periphery as indicated at 19 to a ring 20, preferably formed of steel or the like, which provides a rigid reinforcing means at the inner end of the clutch disc, and also provides for attachment of the clutch hub thereto, the hub 22 being secured to the ring 20 by means of a series of bolts 23 which are secured in tapped openings extending axially through the enlarged portion 24 of the ring 20. The clutch hub 22 is provided with the radially extending flange portion 25 through which the bolts 23 extend, and with an axially extending portion carrying internal splines 26 extending axially thereof and preferably inclined at a slight angle to produce the servo action required.

The hub 22 is preferably formed of cast iron, and at the end opposite the flange 25 is slightly thickened and enlarged to form a recessed shoulder for receiving the oil retaining ring 27 secured to the end of the hub 22 by the set screw 28.

In this embodiment of the invention, the driven member is indicated as the shaft 30, having the reduced pilot portion 32 piloted in the recessed end of the driving member 5 by means of the ball bearings 33, in the usual manner, and having an intermediate splined portion 34 engaged by an intermediate hub member 35 having internal splines engaging with the splines 34 to provide for driving connection therebetween. The member 35 is shown in more detail in Figure 2, in which the splines 36 are indicated for driving connection with the splines 34 of the driven member 30. At its inner end, the member 35 is provided with a recessed shoulder portion 37, adapted to receive the plug member 38, which is piloted in the end of the member 35, and has bearing engagement with the inner race of the bearing assembly 33.

The member 35 is provided with an enlarged portion 39 radially spaced from the lateral surface of the driven member 30, and provided with the external splines 40 adapted to have meshing engagement with the splines 26 of the clutch hub 22. It will be noted that the splines 40 are angled in such manner as to receive the angled splines 26 of the hub 22, whereby upon initial engagement of the friction surfaces 14 with the surface 13, the cone disc member 15 will be threaded axially to the right on the splines, to increase the pressure engagement, thereby increasing the efficiency of torque transmission from the flywheel 7 to the driven member 30.

On the external surface of the splined portion 36 of the member 35 there is provided the annular groove 42, which is adapted to receive the snap ring 43 which serves to maintain the spring abutment plate 44 in position against axial movement inwardly of the member 35. The spring plate 44 has a radially extending portion projecting beyond the external diameter of the intermediate portion of the hub 22, and the clutch spring 45 is biased at opposite ends against the plate 44 and against the internal surface of the flange 25 within the ring 20. The spring 45 normally urges the hub 22, and consequently the cone clutch member 15, axially to the right into clutching engagement with the surface 13.

At its outer end, the hub 22 is recessed to provide a pilot seat for the bearing block or thrust block 46, which may be formed of cast iron or the like, and which has its opposite radial surfaces ground and polished into parallelism. The outer face of the thrust block 46 is engaged by the flanged portion 47 of the clutch actuating collar 48, which is slidably mounted upon the hub portion 49 of the member 50 forming a pilot for the outer end of the driven member 30. The clutch collar 48 is provided on opposite sides with the projecting bosses or finger portions 52 adapted to be engaged by the opposite arms 53 of the clutch yoke 54 mounted for conjoint rotation with the shaft 55 upon which is mounted the clutch operating pedal or similar mechanism. The clutch collar 48 is provided with an offset extension 56 adapted to form a retaining member for one end of the spring 57, the spring being biased to normally move the clutch collar 48 outwardly away from engagement with the thrust block 46.

It will be noted that the member 35 is provided, intermediate the enlarged portion 39 and the portion which is splined to engage the driven member 30, with a plurality of angularly extending ports 60 forming grease ducts between the driven member 30 and the interior of the clutch hub 22. Thus a grease housing is formed between the retaining ring 27 carried by the inner end of the clutch hub 22, and the clutch collar 48 riding on the hub 49 of the member journaling the driven member 30. This grease housing retains the grease for the splined engagement between the splines 40 and the splines 26, and also retains grease for the thrust block or bearing 46 which is engaged by the flange 47 of the clutch collar 48.

In the operation of the structure thus far described, the clutch, which is shown in actuated position, is released by rotation of the shaft 55 in a counterclockwise direction. This produces movement of the arms 53 of the clutch yoke 54 against the projections 52 on the clutch collar 48, moving this collar against the thrust block 46 and consequently moving the clutch hub 22 inwardly, against the pressure of spring 45. At the same time, due to the engagement between splines 40 and 26, the hub is rotated in a clockwise direction, as viewed from the right-hand side of the clutch, and the clutch surfaces 14 are disengaged from the clutch surface 13. This results in releasing the driving torque on the clutch member 15 and consequently the clutch parts have no driving torque applied thereto, and the member 30 is not driven by the rotation of the member 5. Upon release of the clutch collar 48, the spring 45 moves the clutch hub 22 outwardly, resulting in reengagement of the surfaces 14 with the cone surface 13, and upon initial rotation of these surfaces sufficient to produce a driving torque, the clutch member 15 is rotated, by reason of the splined engagement between the hub and the intermediate member 35, to produce an increasing engagement over and above that attained by the spring 45, increasing the pressure to an extent such that a greater driving torque can be transmitted through the clutch mechanism than would be possible if the pressure of spring 45 alone were relied upon for pressure engagement.

By disposing the throw-out member or thrust block 46 within a functional part of the grease housing about the splines 40, it is possible to provide only a single grease housing for lubrication of the entire clutch mechanism which requires lubrication, and the ports 60 insure that lubricant will travel from the interior of the enlarged portion 39 of the member 35 outwardly for contact with the splines 26 and the splines 40.

Referring now to the embodiment of the invention shown in Figures 3 and 4, I have provided a driving member 65, having the flange portion 66 to which is bolted the flywheel 67 by means of bolts 68. The flywheel 67 is provided, on its outer radial face, with a clutch ring portion 69, secured thereto by the peripheral series of bolts 70, and having the conical clutch surface 72 tapered axially outwardly toward the flywheel.

Disposed within the ring 69 is the clutch member 73, having the conical rim portion 74 and the radially inwardly extending flange or disc portion 75. The rim portion 74 is provided with clutch lining 76, secured thereto by the countersunk rivets 77, in any usual or preferred manner, while the disc 75 is provided with a radially extending inner portion 78 adapted to be piloted in the outer end of the flange portion 79 of a clutch hub 80, the flange 79 having the axially extending shoulder portion 82 forming an annular seat for the inner defining edge of the portion 78 of the disc 75. The disc is secured to the flange 79 by means of a plurality of stud bolts 83, which also serve to clamp the retaining ring 84 in position about the outer end of the hub 80. The inner end of the hub 80 is provided with a reduced portion 85 adapted to receive the retaining ring 86 which, as shown in Figure 4, closely embraces the external surface 87 of a ring member 88 carried by the forward edge 89 of the intermediate hub member 90. If desired, a plain ring 88', as shown in Figure 3, may be suitably secured to the end portion 87' of the hub member 90. This intermediate hub member 90 is provided with external splines 92 angled as shown in Figure 3, which are adapted to have engagement with the internal splines 93 formed integral with the hub 80. The splines 92 and 93 are angled in the same manner as described in connection with the embodiment of Figures 1 and 2, in order to produce the servo action in the clutch.

The member 90 is also provided with internal splines 94, which are adapted to have engagement with the splines 95 formed on the inner end of the driven member 96. The driven member 96 has a reduced end 97 piloted in the bearing 98 carried within the flywheel 67, as is conventional.

Clamped between the ring 88 and the inner race of the bearing assembly 98 is the spring abutment plate 99, which has a radially extending portion 100 serving to provide a seat for one end of the helically coiled spring 102 biased between the plate 99 and the inner radial surface of the flange 79 of the hub 80. The spring abutment plate 99 may be apertured, as indicated at 103, and, as shown in Figure 4, the bolts 83 may be replaced by elongated bolts 104, which extend through threaded bosses 105 formed about the apertures 103 of a corresponding plate portion 100', whereby the plate is fixed axially with respect to the flange 79 of the hub 80.

Under such circumstances, the apertures 106 in the flange 79 are slightly larger than the diameter of the bolts 104, to allow the flange 79 to have free sliding movement with relation to the bolts, in order to compress the spring 102 when it is desired to disengage the clutch.

The embodiment of the invention shown in Figure 4 distinguishes from that shown in Figure 3 also in the fact that the retaining ring 84 is not formed as a separate member clamped to the peripheral edge of the disc 75, but the disc 75' is formed from a sheet metal stamping or the like and is provided with an integral offset retaining ring portion 84', which is carried on the pilot shoulder 82 of the flange 79 in the same manner as described in connection with Figure 3.

In both embodiments of the invention, as illustrated in Figures 3 and 4 a throw-out bearing assembly, indicated generally at 110, is provided, this throw-out bearing comprising the inner race 112 piloted in the inner end of the flange 79 at the ends of the splines 93, and an outer race 113 which is centered by the retaining ring 84 or the portion 84' of the disc 75' and between which is provided the series of ball members forming the completed bearing. The outer race 113 is engaged, on its radial surface, by the forward end of the clutch throw-out collar 114, which has sliding engagement on the hub 115 of the housing member 116. A suitable clutch yoke 117 carried on the shaft 118 is provided for moving the clutch collar 114 inwardly to compress the spring 102 and move the disc 75 inwardly to release the engagement between the surface 72 and the lining 76. The outer end of the member 116 provides seating engagement for a portion of the bearing assembly 120, which engages about the shaft 96, which shaft preferably extends into a transmission housing or a similar driving arrangement, in the case of automotive or other types of vehicle, although this portion of the structure forms no part of the present invention.

The throw-out spring 122 is connected between the offset portion 123 of the collar 114 and an offset portion of the member 116.

The clutch operates in the same manner as described in connection with Figures 1 and 2, the servo action being produced by the interengagement of the splines 92 and 93, and thereby serving to increase the pressure of engagement and consequently the torque that can be transmitted, without increasing the pressure of the spring 102.

It will be noted that by reason of the bearing retaining ring 86, and the fact that the hub 115 closely fits the shaft 96, a housing is provided for the spline engagement and for the bearing assembly 110, whereby the throw-out bearing is enclosed within a functional part of this housing.

It is therefore apparent that I have provided a clutch construction of the friction type which is efficient in operation, may be assembled and disassembled as a unit with respect to the driving and driven members, and which is economical in manufacture and assembly.

It will be noted, in each embodiment of the invention, that the shaft 96 or 30 can be readily withdrawn from the assembly without disturbing any of the component parts of the clutch, the clutch remaining in centered position by reason of the retention therein due to the angle of the surfaces of engagement between the member 15 or 73 of the clutch and the driving member. Thus, the driven elements of the clutch can be assembled to the driving member and the entire clutch assembly then connected as a unit to the driven member. Further, by removing the bolts which carry the clutch ring on the flywheel, and removing the driven shaft from within the clutch hub assembly, it is possible to retain the clutch in assembled position and employ it as a unit for connection or disconnection in any desired position between a driving flywheel and a driven shaft. This provides for easy inspection, repair and replacement of the clutch construction.

I do not intend to be limited to the exact details of construction which have been shown and described, inasmuch as these are merely illustrative embodiments of the underlying principles of the invention. The invention is therefore to be limited only as defined by the spirit and scope of the appended claims.

I claim:

1. In combination, a driving member having a conical surface, a clutch disc having a conical rim, a driven member coaxial of said disc, an intermediate member having splined engagement with said driven member and having a radially spaced overlapping cylindrical portion provided with external helical splines, a hub member secured to said disc and having internal helical splines engaging said first-named helical splines, a grease retaining ring at the inner end of said hub closely embracing the external surface of said intermediate member forwardly of said splines, a bearing block carried by said hub at the opposite end thereof embracing said driven member, and grease ducts extending through said intermediate member between said radially spaced portion and the portion embraced by said ring.

2. In combination, a driving member having a conical surface, a driven member coaxial therewith, a clutch disc having a conical rim and a radially inwardly extending flange, a hub rigidly secured to said flange and radially spaced about said driven member, an intermediate member having a forward portion drivingly engaging said driven member and having a radially enlarged rear portion extending within and drivingly engaged by said hub, an abutment plate carried by and held against forward movement by the forward portion of said intermediate member, spring means biased between said hub and said plate about the external surface of said hub within the axial length of said disc, a throw-out bearing carried by said hub rearwardly of said intermediate member, and means engaging said bearing for moving said hub axially against the pressure of said spring means.

3. In combination, a driven shaft having a splined end, a clutch disc having a radial flange, an axially extending hub rigidly secured to the inner edge of said disc and provided with internal helical splines spaced radially of said shaft, an intermediate member having splined connection with said shaft and having a radially enlarged portion having splined engagement with said hub, means at opposite ends of said hub forming a grease housing about said radially enlarged portion, and grease ducts extending radially through said intermediate member between the ends of said hub.

4. An intermediate member for interposition between an internally splined hub of a clutch disc and a coaxial shaft, comprising a shaft engaging portion non-rotatably engaging said shaft and an enlarged axially extending portion provided with external splines engaging the splines of said hub, the external portion of said shaft engaging portion having an annular recess receiving a lock ring for a spring abutment plate.

5. A friction clutch of the servo type, comprising a driving member having a conical surface, a driven member coaxial therewith, a clutch face, a driven member coaxial therewith, a clutch member therebetween having a conical rim and having an axially extending internally splined hub spaced radially about said driven member, an intermediate member within said hub for transmitting torque from said hub to said driven member, an abutment plate carried by said intermediate member adjacent one end of said hub, spring means biased between said plate and said hub externally of the axially extending portion of said hub, and within said clutch member, and bearing means carried at the opposite end of said hub and adapted to be engaged by the clutch operating mechanism.

6. A friction clutch of the servo type, comprising a driving member having a conical surface, a driven member coaxial therewith, a clutch face, a driven member coaxial therewith, a clutch member therebetween having a conical rim and having an axially extending internally splined hub spaced radially about said driven member, an intermediate member within said hub for transmitting torque from said hub to said driven member, an abutment plate carried by said intermediate member adjacent one end of said hub, spring means biased between said plate and said hub externally of the axially extending portion of said hub and within said clutch member, a grease retaining ring at the said adjacent end of said hub embracing said intermediate member, a throw-out bearing at the opposite end of said hub embracing said driven member, and clutch actuating means outwardly of said bearing whereby said bearing is enclosed in the functional part of the grease housing formed between said hub and said driven member.

7. A hub structure for a friction clutch of the class described, comprising a clutch hub having internal splines and having a radial flange at one end, an intermediate hub member adapted to have splined connection to a driven shaft and having external splines meshing with the hub splines, a radially extending abutment plate adjacent the opposite end of said clutch hub, means carried by said intermediate hub member supporting said plate against axial movement away from said flange, and spring means encircling said hub and biased between said plate and said flange.

8. A hub structure for a friction clutch of the class described, comprising a clutch hub having internal splines and having a radial flange at one end, an intermediate hub member adapted to have splined connection to a driven shaft and having external splines meshing with the hub splines, a grease retaining ring embracing said intermediate member and carried by the opposite end of said hub, a throw-out bearing carried by said hub adjacent said flange, and actuating means engaging said bearing and forming with said ring a grease housing for said bearing and said splined connection between said hub and said intermediate member.

9. A hub structure for a friction clutch of the class described, comprising a clutch hub having internal splines and having a radial flange at one end, an intermediate hub member adapted to have splined connection to a driven shaft and having external splines meshing with the hub splines, a grease retaining ring embracing said intermediate member and carried by the opposite end of said hub, a throw-out bearing carried by said hub adjacent said flange, and actuating means engaging said bearing and forming with said ring a grease housing for said bearing and said splined connection between said hub and said intermediate member, a radially extending abutment plate adjacent the opposite end of said clutch hub, and spring means encircling said hub and biased between said plate and said flange.

10. In a friction clutch, a clutch member having a radially inwardly extending flange, a clutch hub having a radially outwardly extending flange at one end thereof, an abutment plate coaxial of and spaced from the opposite end of said hub, spring means between said plate and said hub flange, and means clamping said clutch flange to said hub flange and holding said plate in spaced axial relation to said hub flange.

11. In a friction clutch, a clutch member having a radially inwardly extending flange, a clutch hub having a radially outwardly extending flange at one end thereof, an abutment plate coaxial of and spaced from the opposite end of said hub, spring means between said plate and said hub flange, means clamping said clutch flange to said hub flange and holding said plate in spaced axial relation to said hub flange, and means extending radially inwardly from said clutch flange for retaining a throw-out bearing in position in the said one end of said hub.

THOMAS L. FAWICK.